US012105908B2

(12) United States Patent
Wang et al.

(10) Patent No.: US 12,105,908 B2
(45) Date of Patent: Oct. 1, 2024

(54) TRANSMISSION SYSTEM OF COOPERATING TOUCH DEVICES

(71) Applicant: NOVATEK Microelectronics Corp., Hsinchu (TW)

(72) Inventors: Yi-Hsien Wang, Hsinchu County (TW); Yun-Hsiang Yeh, Hsinchu County (TW)

(73) Assignee: NOVATEK Microelectronics Corp., Hsinchu (TW)

( * ) Notice: Subject to any disclaimer, the term of this patent is extended or adjusted under 35 U.S.C. 154(b) by 0 days.

(21) Appl. No.: 18/348,363

(22) Filed: Jul. 7, 2023

(65) Prior Publication Data
US 2023/0350515 A1 Nov. 2, 2023

Related U.S. Application Data

(63) Continuation of application No. 17/811,066, filed on Jul. 6, 2022, now Pat. No. 11,747,936.

(60) Provisional application No. 63/221,011, filed on Jul. 13, 2021.

(30) Foreign Application Priority Data

Jan. 28, 2022 (TW) ................. 11110407.2

(51) Int. Cl.
G06F 3/041 (2006.01)
G06F 3/044 (2006.01)

(52) U.S. Cl.
CPC ........ G06F 3/04162 (2019.05); G06F 3/0443 (2019.05)

(58) Field of Classification Search
CPC ..................... G06F 3/04162; G06F 3/0443
See application file for complete search history.

(56) References Cited

U.S. PATENT DOCUMENTS

2007/0300307 A1\* 12/2007 Duncan ................... G06F 21/31
726/27
2014/0176436 A1\* 6/2014 Raffa .................... G06F 3/0304
345/158

FOREIGN PATENT DOCUMENTS

TW 498286 B 8/2002

\* cited by examiner

*Primary Examiner* — Lisa S Landis
(74) *Attorney, Agent, or Firm* — CKC & Partners Co., LLC

(57) ABSTRACT

A transmission system includes a first touch device and a second touch device. The second touch device includes a transmission region and the transmission region forms an invisible barcode. The first touch device and the second touch device work together to operate in a touch mode or in an application mode. When the first touch device and the second touch device work together to operate in the application mode, the transmission region uses the invisible barcode to transmit a transmission signal to the first touch device to unlock the first touch device.

9 Claims, 19 Drawing Sheets

TRANSMISSION SYSTEM OF COOPERATING TOUCH DEVICES

RELATED APPLICATIONS

This application is a continuation application of U.S. application Ser. No. 17/811,066, filed Jul. 6, 2022, which claims priority to U.S. Provisional Application Ser. No. 63/221,011, filed Jul. 13, 2021 and Taiwanese Application Serial Number 111104072, filed Jan. 28, 2022, which are herein incorporated by reference.

BACKGROUND

Technical Field

The present disclosure relates to touch technology. More particularly, the present disclosure relates to a transmission system, a processor, and a transmission method.

Description of Related Art

With developments of technology, more and more electronic apparatuses are designed with touch devices. In general, a touch device can detect a touch event and a touch position on the touch device, and perform related operation according to the touch position.

SUMMARY

Some aspects of the present disclosure are to provide a transmission system. The transmission system includes a first touch device and a second touch device. The second touch device includes a transmission region and the transmission region forms an invisible barcode. The first touch device and the second touch device work together to operate in a touch mode or in an application mode. When the first touch device and the second touch device work together to operate in the application mode, the transmission region uses the invisible barcode to transmit a transmission signal to the first touch device to unlock the first touch device.

BRIEF DESCRIPTION OF THE DRAWINGS

The disclosure can be more fully understood by reading the following detailed description of the embodiment, with reference made to the accompanying drawings as follows.

DETAILED DESCRIPTION

In the present disclosure, "connected" or "coupled" may refer to "electrically connected" or "electrically coupled." "Connected" or "coupled" may also refer to operations or actions between two or more elements.

Figure 1:
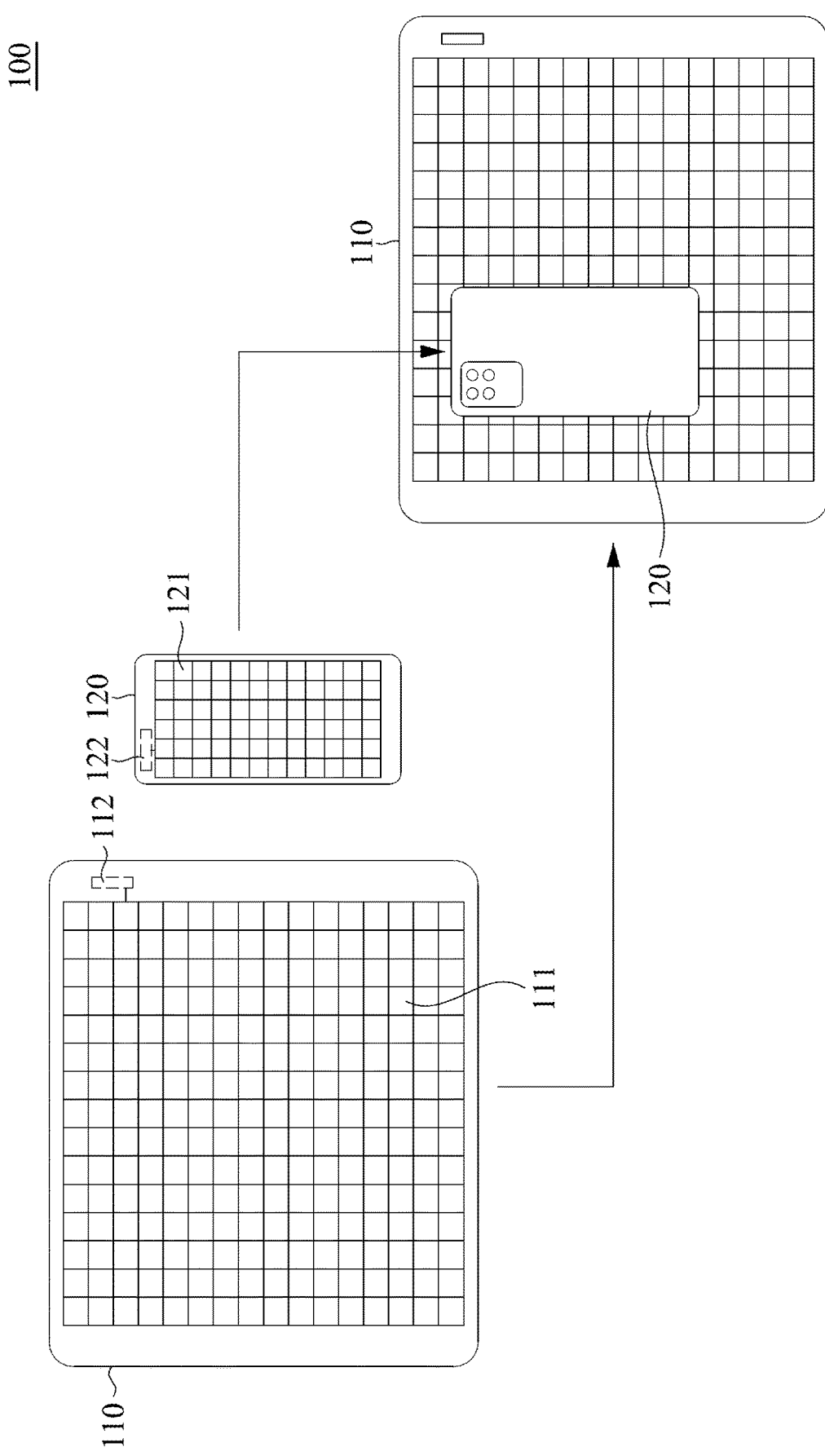
FIG. 1 is a schematic diagram illustrating a transmission system according to some embodiments of the present disclosure.

Reference is made to FIG. 1. FIG. 1 is a schematic diagram illustrating a transmission system 100 according to some embodiments of the present disclosure.

As illustrated in FIG. 1, the transmission system 100 includes a touch device 110 and a touch device 120. In this example, the touch device 110 is a tablet and the touch device 120 is a cell phone, but the present disclosure is not limited thereto. In some embodiments, the touch device 110 or the touch device 120 can be a notebook, a car display device, or other apparatuses with touch functions. The touch device 110 has a touch panel 111 and a processor (e.g., TDDI IC) 112, and the processor 112 is coupled to the touch panel 111. The touch device 120 has a touch panel 121 and a processor (e.g., TDDI IC) 122, and the processor 122 is coupled to the touch panel 121. The touch panel 111 and the touch panel 121 have in-cell structures and self-capacitance type structures. In other words, electrodes in the touch panel 111 (or 121) are disposed in a single-layer.

The touch device 110 or the touch device 120 can operate in a first mode (normal touch mode) or a second mode (application mode/non-touch mode).

When the touch device 110 (or 120) operates individually and operates in the normal touch mode, the processor 112 (or 122) can determine a touch event on the touch panel 111 (or 121). In other words, the electrodes in the touch panel 111 (or 121) can operate as transmitting electrodes (in a transmitting state) in a first time interval, and these electrodes can operate as receiving electrodes (in a receiving state) in a second time interval.

In addition, the touch devices 110 and 120 can work together to operate in the application mode. In some embodiments, the touch panel 121 contacts the touch panel 111 by face-to-face (e.g., panel-to-panel). In some other embodiments, the touch panel 121 is significantly close to the touch panel 111 by face-to-face (e.g., panel-to-panel). For example, when the touch panel 121 contacts or is significantly close to the touch panel 111 by face-to-face (e.g., panel-to-panel) and there is a motion or rotation (motion trajectory or rotation angle) between the touch panel 121 and the touch panel 111, the processor 112 can perform an application according to this motion trajectory or this rotation angle. As described above, since the touch panel 111 and the touch panel 121 have in-cell structures and self-capacitance type structures, the processor 112 can acquire an absolute motion trajectory or an absolute rotation angle of the touch panel 121 and perform the application according to this absolute motion trajectory or this absolute rotation angle.

As described above, the touch panel 111 and the touch panel 121 have self-capacitance type structures. In other words, each electrode (each position) on the touch panel 111 and the touch panel 121 can emit signal or receive signal individually. Accordingly, for the processor 112, each electrode on the touch panel 111 corresponds to an absolute position (absolute coordinates). For the processor 122, each electrode on the touch panel 121 corresponds to an absolute position (absolute coordinates).

With this configuration, in the application mode, the touch device 120 operates in the emitting state and the touch device 110 operates in the receiving state to determine the absolute motion trajectory or the absolute rotation angle of the touch panel 121. In some embodiments, in the application mode, the touch device 120 does not receive any signal from the touch device 110 for determining the absolute motion trajectory or the absolute rotation angle of the touch panel 121. When the touch device 120 is in the emitting state and some electrodes on the touch panel 121 emit transmitting signals, the touch device 110 is in the receiving state and some electrodes on the touch panel 111 receive corresponding sensing signals. The processor 112 in the touch device 110 can acquire the absolute motion trajectory or the absolute rotation angle according to the absolute positions (absolute coordinates) of the electrodes which receive the sensing signals.

Figure 2:
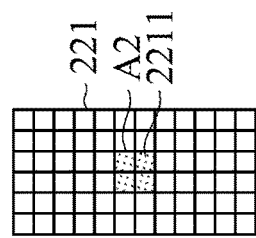
FIG. 2 is a schematic diagram illustrating a transmission system according to some embodiments of the present disclosure.
Figure 2:
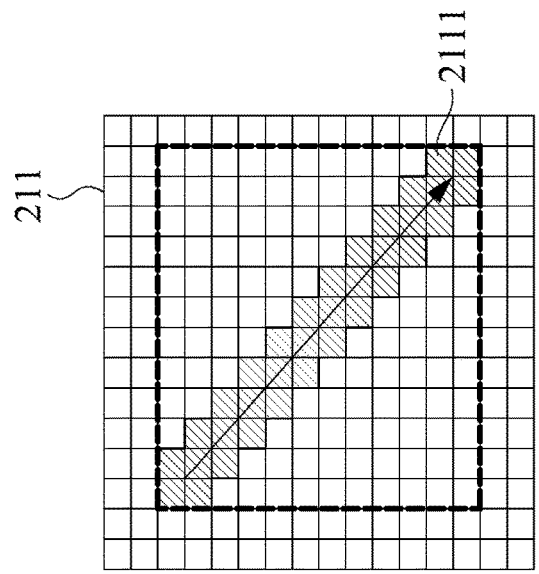
Figure 2:
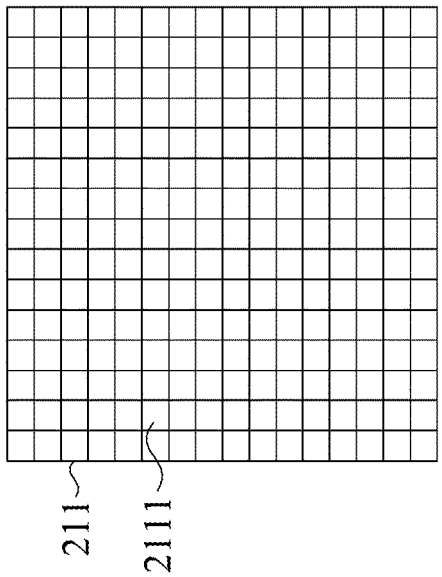
Figure 2:
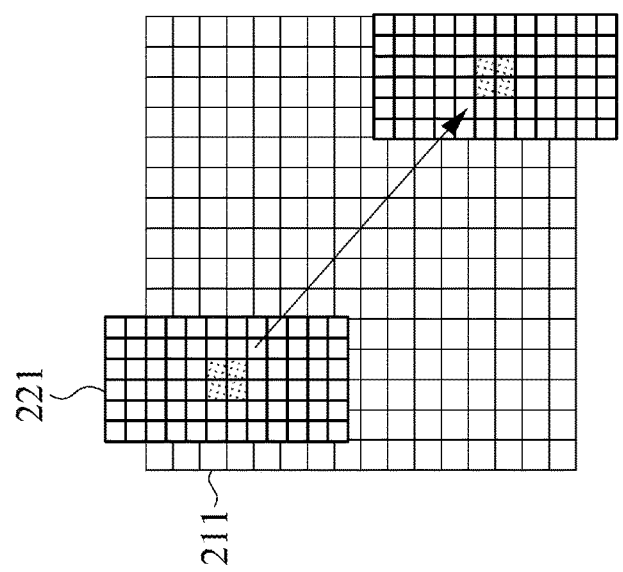

Reference is made to FIG. 2. FIG. 2 is a schematic diagram illustrating a transmission system 200 according to some embodiments of the present disclosure. In some embodiments, the transmission system 200 in FIG. 2 can be used to implement the transmission system 100 in FIG. 1.

The transmission system 200 includes a touch panel 211 and a touch panel 221. As described above, two touch devices can work together to operate in the application mode. As illustrated in FIG. 2, electrodes 2211 in the touch panel 221 correspond to a specific pattern. In FIG. 2, the pattern corresponds to one transmission region A2, and the transmission region A2 is in a square-shape. The electrodes in the transmission region A2 operate as transmitting electrodes to emit transmitting signals with a first frequency, and electrodes 2111 on the touch panel 211 operate as receiving electrodes to receive sensing signals. In some embodiments, the touch device including the touch panel 211 can perform a handshake process with the touch device including the touch panel 221 in advance to determine which device operates as a transmitter, which device operates as a receiver, the shape of the transmission region A2, and the first frequency.

When the touch panel 221 contacts or is significantly close to the touch panel 211 and there is a motion between the touch panel 221 and the touch panel 211, the electrodes 2111 in the touch panel 211 can receive sensing signals. A processor coupled to the touch panel 211 can collect the sensing signals and acquire an absolute motion trajectory of the touch panel 221 according to the collected signals. Then, the processor can perform an application according to this absolute motion trajectory.

Based the descriptions above, in this configuration, when two touch devices operate individually and operates in the normal touch mode, the electrodes in the two touch panels not only operate as the transmitting electrodes (e.g., operate as the transmitting electrodes in a first time interval) but also operate as the receiving electrodes (e.g., operate as the receiving electrodes in a second time interval) (not only in the transmitting state but also in the receiving state). When two touch devices work together to operate in the application mode, the electrodes in one touch panel operate as the transmitting electrodes (in the transmitting state), and the electrodes in the other touch panel operate as the receiving electrodes (in the receiving state).

Figure 3:
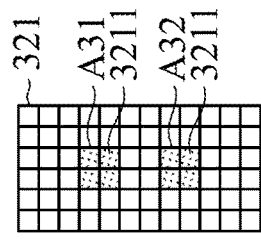
FIG. 3 is a schematic diagram illustrating a transmission system according to some embodiments of the present disclosure.
Figure 3:
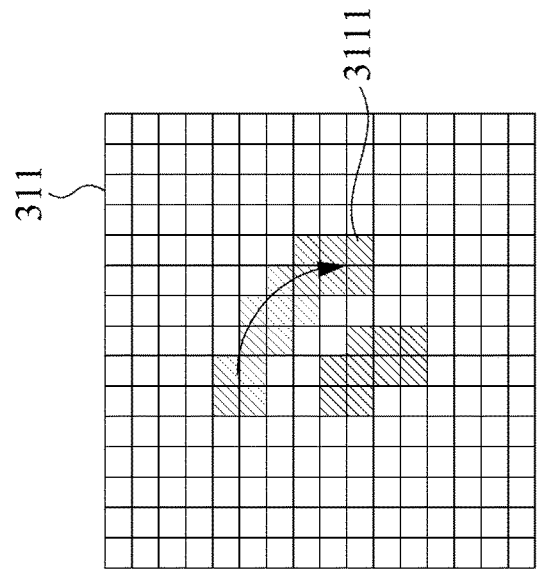
Figure 3:
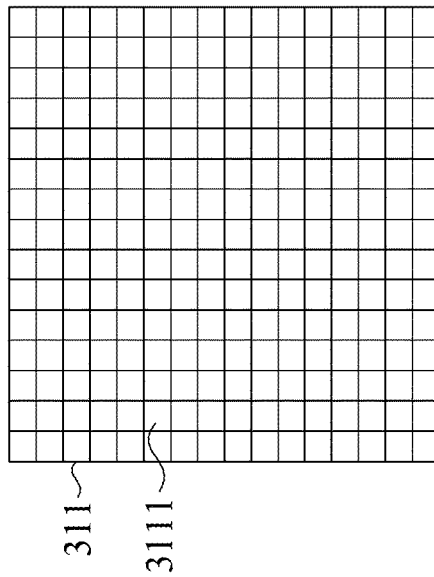
Figure 3:
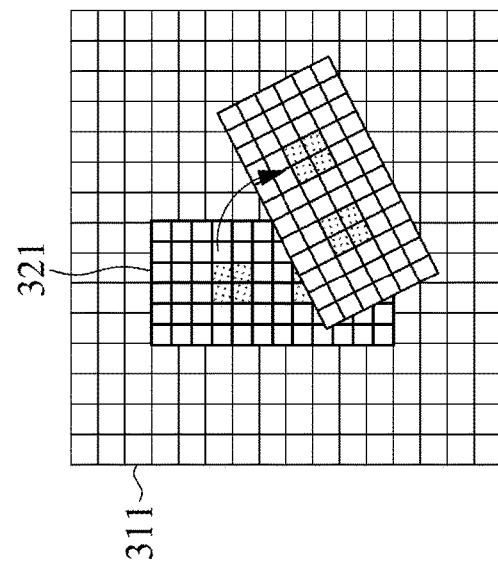

Reference is made to FIG. 3. FIG. 3 is a schematic diagram illustrating a transmission system 300 according to some embodiments of the present disclosure. In some embodiments, the transmission system 300 in FIG. 3 can be used to implement the transmission system 100 in FIG. 1.

A touch panel 311 and a touch panel 321 in FIG. 3 are similar to the touch panel 211 and the touch panel 221 in FIG. 2. One of major differences between FIG. 3 and FIG. 2 is that, electrodes 3211 in the touch panel 321 correspond to a specific pattern, the specific pattern corresponds to two transmission regions A31 and A32, the transmission region A31 is in a square-shape and the electrodes 3211 in the transmission region A31 can emit the transmitting signals with a first frequency, and the transmission region A32 is in a square-shape and the electrodes 3211 in the transmission region A32 can emit the transmitting signals with a second frequency, in which the second frequency is different from the first frequency. In other words, different transmission regions A31-A32 can emit transmitting signals with different frequencies. In some embodiments, the touch device including the touch panel 311 can perform a handshake process with the touch device including the touch panel 321 in advance to determine which device operates as a transmitter, which device operates as a receiver, the shapes of the transmission regions A31-A32, the first frequency, and the second frequency.

As illustrated in FIG. 3, when the touch panel 321 contacts or is significantly close to the touch panel 311 and there is a rotation between the touch panel 321 and the touch panel 311, electrodes 3111 in the touch panel 311 can receive sensing signals. A processor coupled to the touch panel 311 can collect the sensing signals and acquire an absolute rotation angle of the touch panel 321 according to the collected signals. Then, the processor can perform an application according to this absolute rotation angle.

Figure 4:
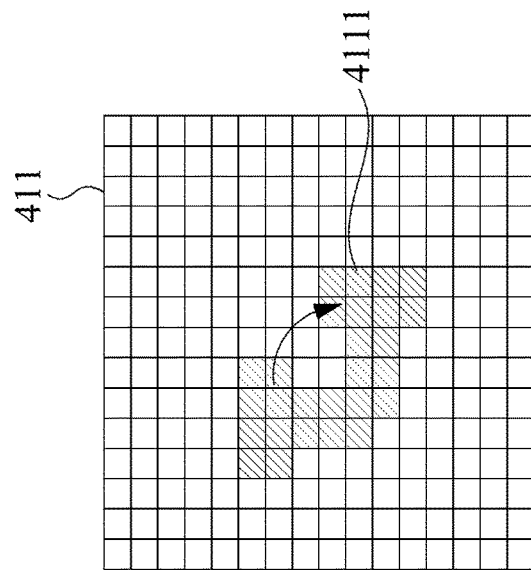
FIG. 4 is a schematic diagram illustrating a transmission system according to some embodiments of the present disclosure.
Figure 4:
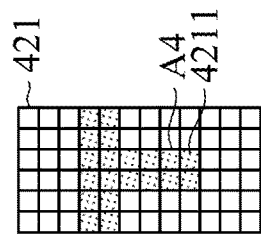
Figure 4:
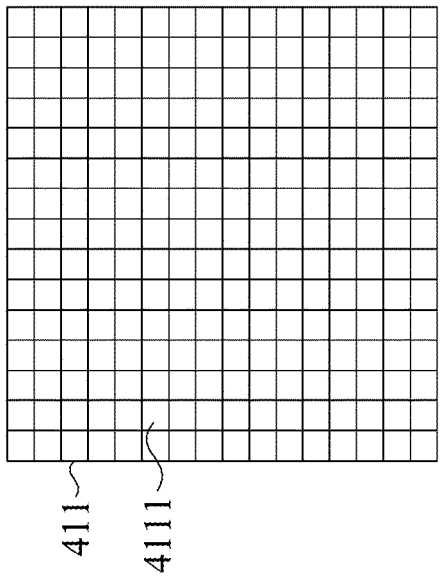
Figure 4:
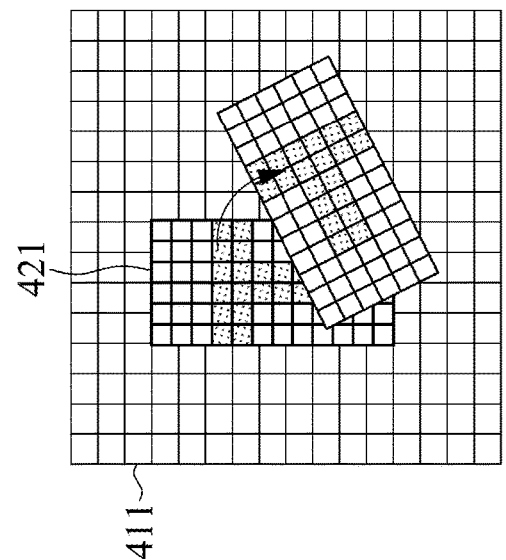

Reference is made to FIG. 4. FIG. 4 is a schematic diagram illustrating a transmission system 400 according to some embodiments of the present disclosure. In some embodiments, the transmission system 400 in FIG. 4 can be used to implement the transmission system 100 in FIG. 1.

A touch panel 411 and a touch panel 421 in FIG. 4 are similar to the touch panel 311 and the touch panel 321 in FIG. 3. One of major differences between FIG. 4 and FIG. 3 is that, electrodes 4211 in the touch panel 421 correspond to a specific pattern, the specific pattern corresponds to one transmission region A4, the transmission region A4 is in a T-shape, and the electrodes 4211 in the transmission region A4 can emit the transmitting signals with a first frequency. In some embodiments, the touch device including the touch panel 411 can perform a handshake process with the touch device including the touch panel 421 in advance to determine which device operates as a transmitter, which device operates as a receiver, the shape of the transmission region A4, and the first frequency.

As illustrated in FIG. 4, when the touch panel 421 contacts or is significantly close to the touch panel 411 and there is a rotation between the touch panel 421 and the touch panel 411, electrodes 4111 in the touch panel 411 can receive sensing signals. A processor coupled to the touch panel 411 can collect the sensing signals and acquire an absolute rotation angle of the touch panel 421 according to the collected signals. Then, the processor can perform an application according to this absolute rotation angle.

Figure 5:
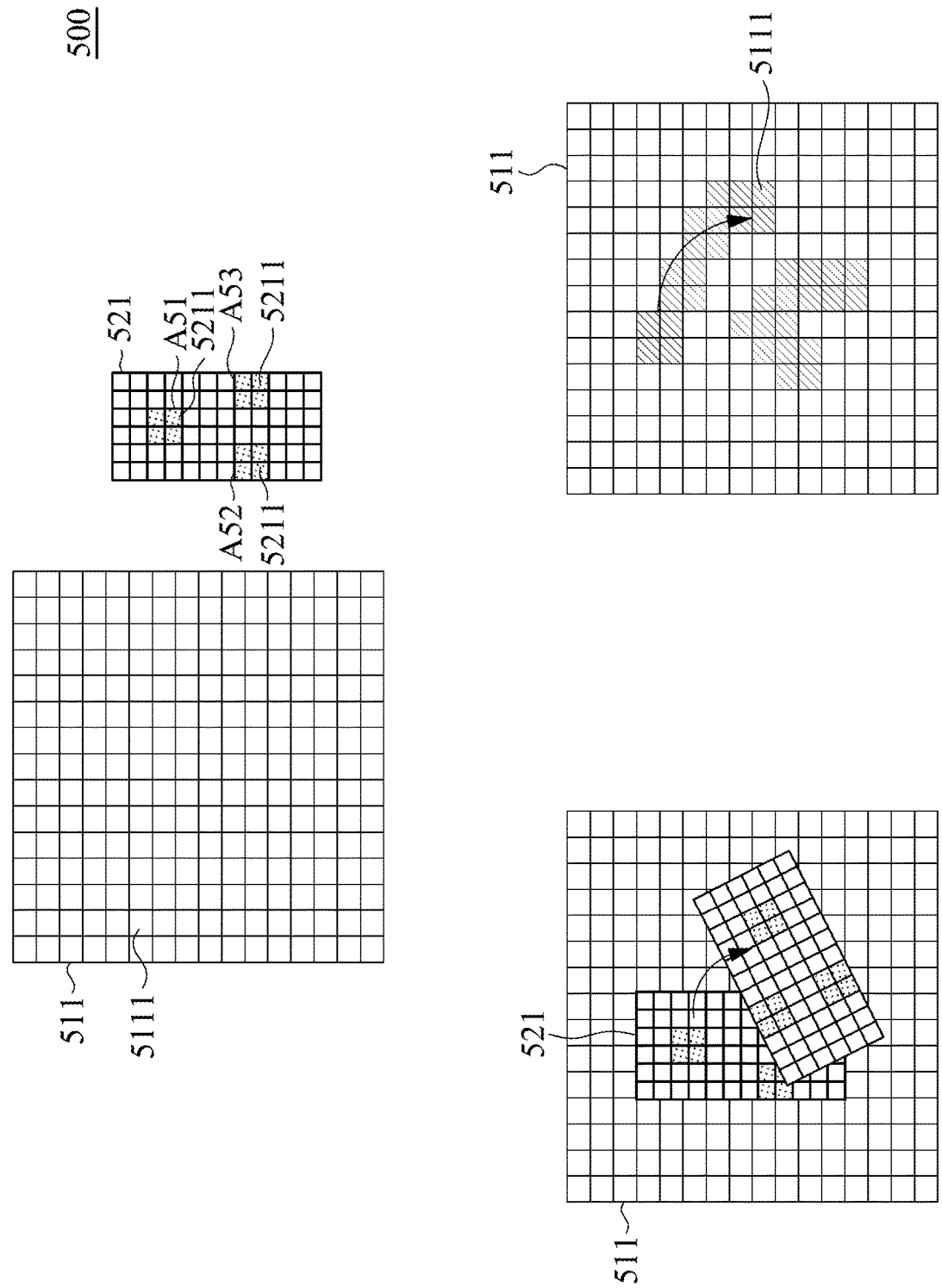
FIG. 5 is a schematic diagram illustrating a transmission system according to some embodiments of the present disclosure.

Reference is made to FIG. 5. Reference is made to FIG. 5. FIG. 5 is a schematic diagram illustrating a transmission system 500 according to some embodiments of the present disclosure. In some embodiments, the transmission system 500 in FIG. 5 can be used to implement the transmission system 100 in FIG. 1.

A touch panel 511 and a touch panel 521 in FIG. 5 are similar to the touch panel 311 and the touch panel 321 in FIG. 3. One of major differences between FIG. 5 and FIG. 3 is that, electrodes 5211 in the touch panel 521 correspond to a specific pattern, the specific pattern corresponds to more than two transmission regions (e.g., three transmission regions A51-A53), each of the transmission regions A51-A53 is in a square-shape, and the electrodes 5211 in the transmission region A51-A53 can emit the transmitting signals with a first frequency (the same frequency). In some embodiments, the touch device including the touch panel 511 can perform a handshake process with the touch device including the touch panel 521 in advance to determine which device operates as a transmitter, which device operates as a receiver, the shapes of the transmission regions A51-A53, and the first frequency.

As illustrated in FIG. 5, when the touch panel 521 contacts or is significantly close to the touch panel 511 and there is a rotation between the touch panel 521 and the touch panel 511, electrodes 5111 in the touch panel 511 can receive sensing signals. A processor coupled to the touch panel 511 can collect the sensing signals and acquire an absolute rotation angle of the touch panel 521 according to the collected signals. Then, the processor can perform an application according to this absolute rotation angle.

Figure 6:
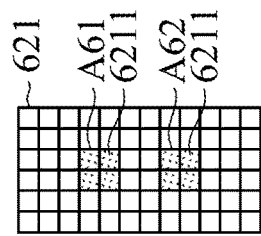
FIG. 6 is a schematic diagram illustrating a transmission system according to some embodiments of the present disclosure.
Figure 6:
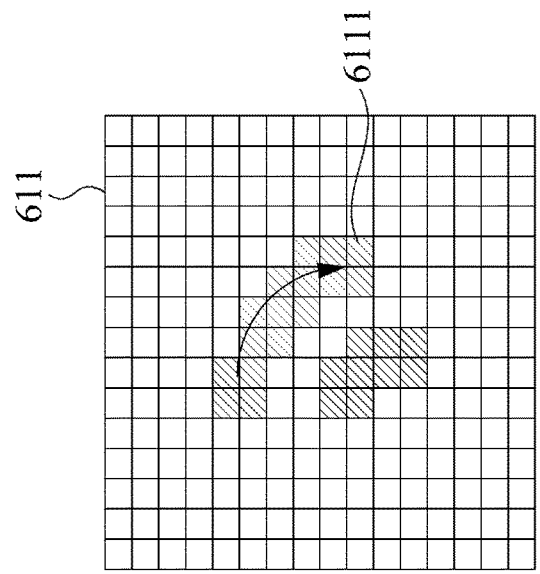
Figure 6:
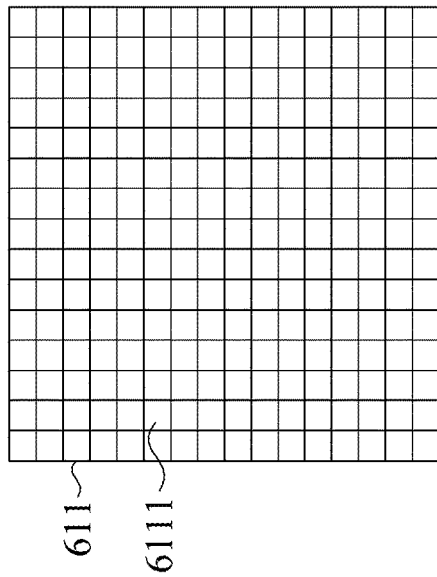
Figure 6:
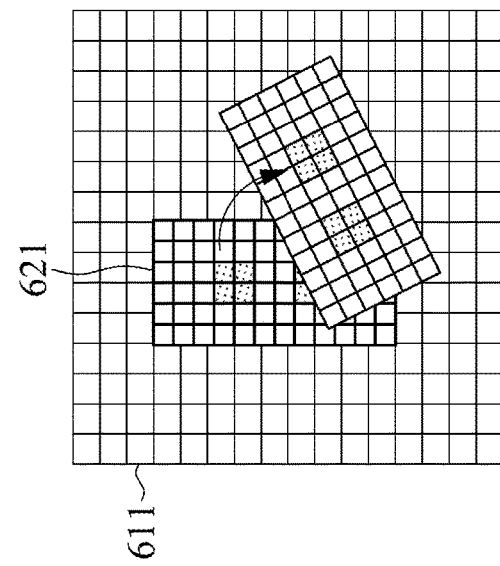

Reference is made to FIG. 6. FIG. 6 is a schematic diagram illustrating a transmission system 600 according to some embodiments of the present disclosure. In some embodiments, the transmission system 600 in FIG. 6 can be used to implement the transmission system 100 in FIG. 1.

A touch panel 611 and a touch panel 621 in FIG. 6 are similar to the touch panel 311 and the touch panel 321 in FIG. 3. Electrodes 6211 in the touch panel 621 correspond to a specific pattern, the specific pattern corresponds to two transmission regions A61 and A62, each of the transmission regions A61 and A62 is in a square-shape, the electrodes 6211 in the transmission region A61 can emit the transmitting signals with a first frequency and a first digital code, and the electrodes 6211 in the transmission region A62 can emit the transmitting signals with the first frequency and a second digital code. In other words, different transmission regions A61-A62 emit transmitting signals with the same frequency but with different digital codes. The different digital codes correspond to different phase combinations. For example, the first digital code is "101" and the second digital code is "111". In some embodiments, a phase of the code value "1" of one bit and a phase of the code value "0" of one bit are different by 180 degrees. In some embodiments, the touch device including the touch panel 611 can perform a handshake process with the touch device including the touch panel 621 in advance to determine which device operates as a transmitter, which device operates as a receiver, the shapes of the transmission regions A61-A62, the first frequency, and the digital codes.

As illustrated in FIG. 6, when the touch panel 621 contacts or is significantly close to the touch panel 611 and there is a rotation between the touch panel 621 and the touch panel 611, electrodes 6111 in the touch panel 611 can receive sensing signals. A processor coupled to the touch panel 611 can collect the sensing signals and acquire an absolute rotation angle of the touch panel 621 according to the collected signals. Then, the processor can perform an application according to this absolute rotation angle.

Figure 7:
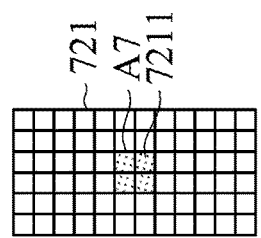
FIG. 7 is a schematic diagram illustrating a transmission system according to some embodiments of the present disclosure.
Figure 7:
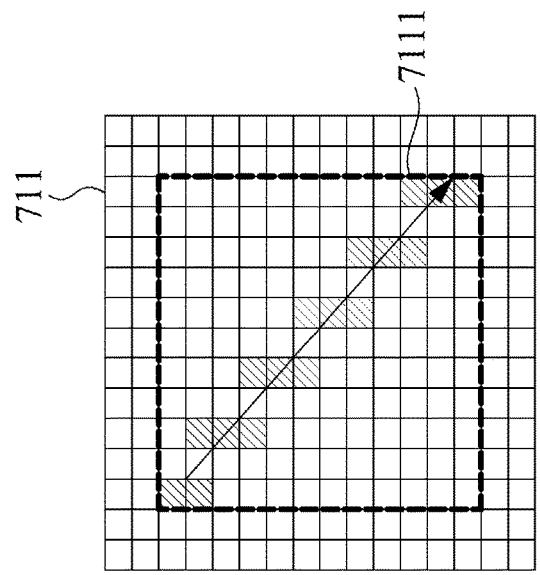
Figure 7:
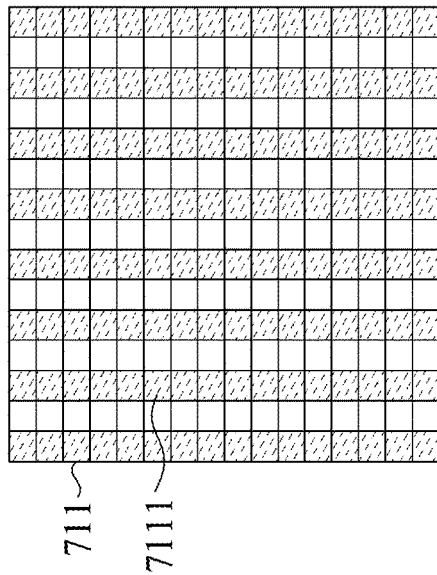
Figure 7:
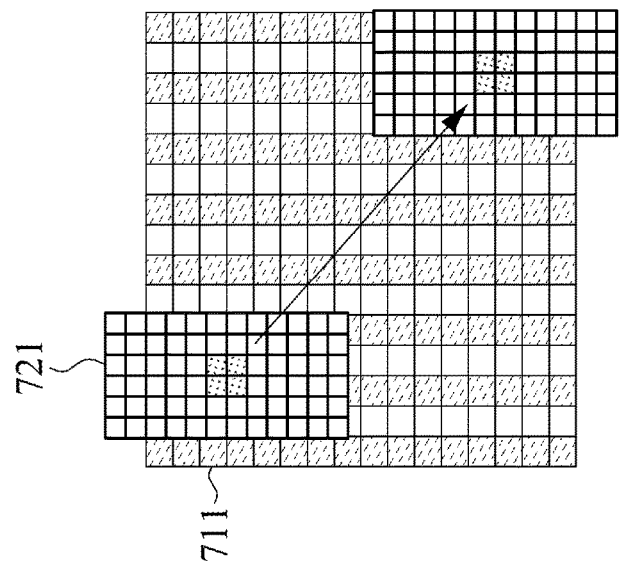

Reference is made to FIG. 7. FIG. 7 is a schematic diagram illustrating a transmission system 700 according to some embodiments of the present disclosure. In some embodiments, the transmission system 700 in FIG. 7 can be used to implement the transmission system 100 in FIG. 1.

A touch panel 711 and a touch panel 721 in FIG. 7 are similar to the touch panel 211 and the touch panel 221 in FIG. 2. Electrodes 7211 in the touch panel 721 correspond to a specific pattern, the specific pattern is similar to FIG. 2. As illustrated in FIG. 7, the specific pattern corresponds to a transmission region A7, the transmission region A7 is in a square-shape, and the electrodes 7211 in the transmission region A7 can emit the transmitting signals with a first frequency. One of major differences between FIG. 7 and FIG. 2 is that, in FIG. 7, electrodes 7111 on some columns are able (enabled) to receive sensing signals, and electrodes 7111 on other columns are unable (disabled) to receive the sensing signals. For example, the electrodes 7111 on the odd columns are able to receive the sensing signals, and the electrodes 7111 on the even columns are unable to receive the sensing signals. In other words, the electrodes 7111 on the odd columns operate as receiving electrodes, and the electrodes 7111 on the even columns operate as dummy electrodes (in a dummy state). In some embodiments, the touch device including the touch panel 711 can perform a handshake process with the touch device including the touch panel 721 in advance to determine which device operates as a transmitter, which device operates as a receiver, the shape of the transmission region A7, the first frequency, and which electrodes 7111 are enabled.

As illustrated in FIG. 7, when the touch panel 721 contacts or is significantly close to the touch panel 711 and there is a motion between the touch panel 721 and the touch panel 711, the electrodes 7111 on the odd columns are able to receive the sensing signals. A processor coupled to the touch panel 711 can collect the sensing signals and acquire an absolute motion trajectory of the touch panel 721 according to the collected signals. Then, the processor can perform an application according to this absolute motion trajectory. In this embodiment, power can be saved.

Figure 8:
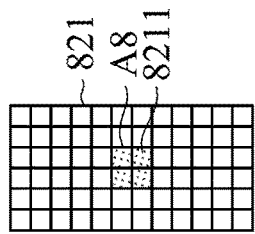
FIG. 8 is a schematic diagram illustrating a transmission system according to some embodiments of the present disclosure.
Figure 8:
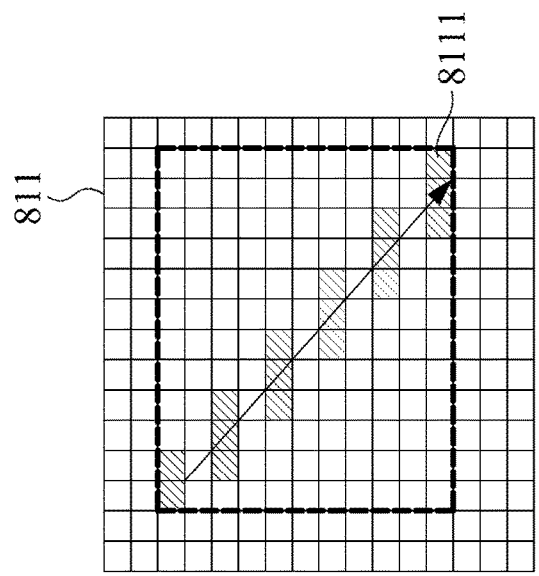
Figure 8:
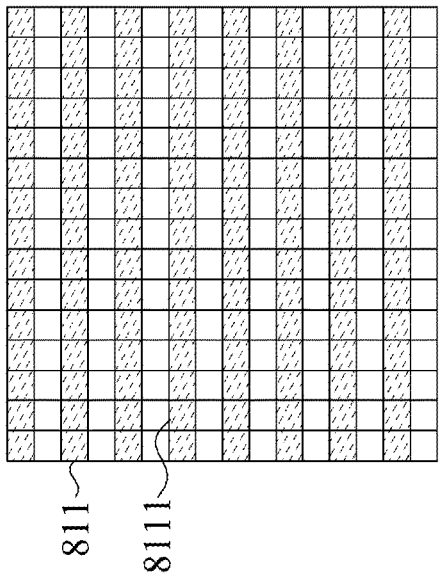
Figure 8:
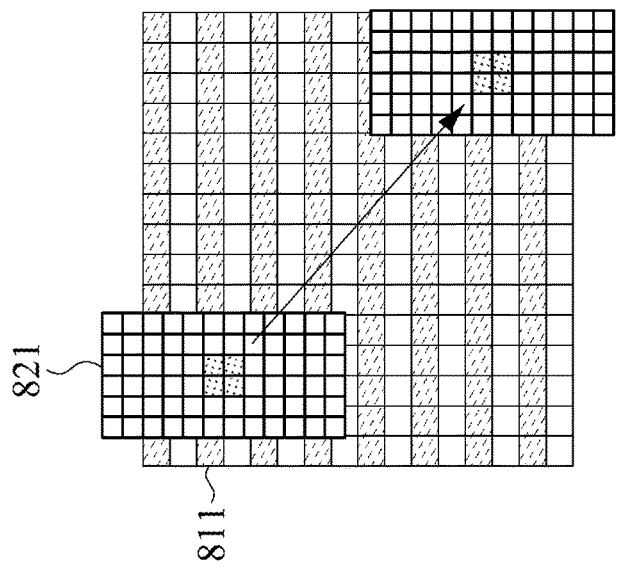

Reference is made to FIG. 8. FIG. 8 is a schematic diagram illustrating a transmission system 800 according to some embodiments of the present disclosure. In some embodiments, the transmission system 800 in FIG. 8 can be used to implement the transmission system 100 in FIG. 1.

A touch panel 811 and a touch panel 821 in FIG. 8 are similar to the touch panel 711 and the touch panel 721 in FIG. 7. Electrodes 8211 in the touch panel 821 correspond to a specific pattern, the specific pattern is similar to FIG. 7. As illustrated in FIG. 8, the specific pattern corresponds to a transmission region A8, the transmission region A8 is in a square-shape, and the electrodes 8211 in the transmission region A8 can emit the transmitting signals with a first frequency. One of major differences between FIG. 8 and FIG. 7 is that, in FIG. 8, electrodes 8111 on some rows are able (enabled) to receive sensing signals, and electrodes 8111 on other rows are unable (disabled) to receive the sensing signals. For example, the electrodes 8111 on the odd rows are able to receive the sensing signals, and the electrodes 8111 on the even rows are unable to receive the sensing signals. In other words, the electrodes 8111 on the odd rows operate as receiving electrodes, and the electrodes 8111 on the even rows operate as dummy electrodes (in a dummy state). In some embodiments, the touch device including the touch panel 811 can perform a handshake process with the touch device including the touch panel 821 in advance to determine which device operates as a transmitter, which device operates as a receiver, the shape of the transmission region A8, the first frequency, and which electrodes 8111 are enabled.

As illustrated in FIG. 8, when the touch panel 821 contacts or is significantly close to the touch panel 811 and there is a motion between the touch panel 821 and the touch panel 811, the electrodes 8111 on the odd rows are able to receive the sensing signals. A processor coupled to the touch panel 811 can collect the sensing signals and acquire an absolute motion trajectory of the touch panel 821 according to the collected signals. Then, the processor can perform an application according to this absolute motion trajectory. In this embodiment, power can be saved.

Figure 9:
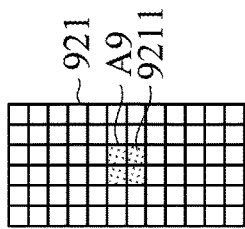
FIG. 9 is a schematic diagram illustrating a transmission system according to some embodiments of the present disclosure.
Figure 9:
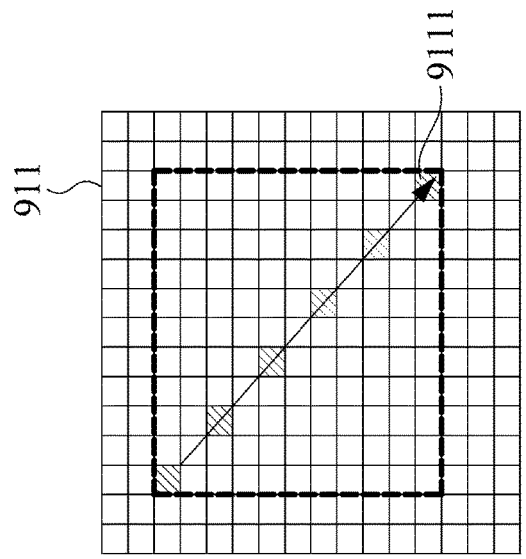
Figure 9:
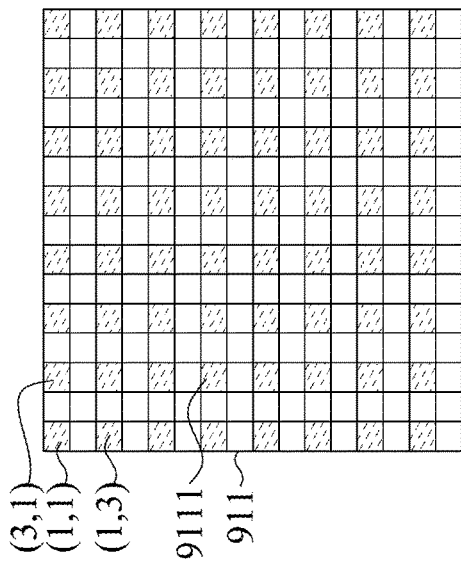
Figure 9:
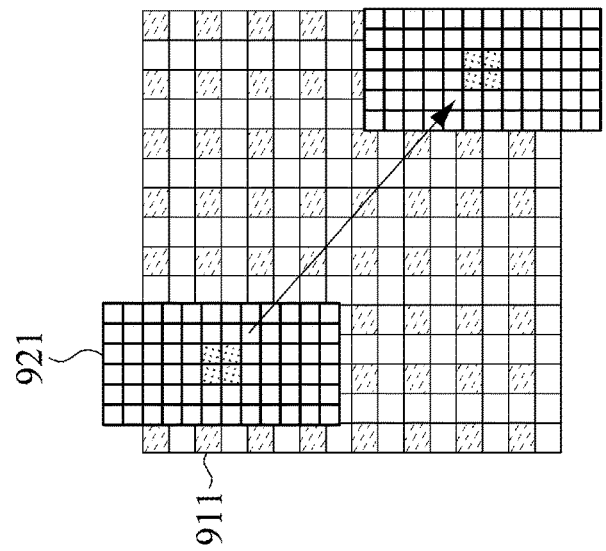

Reference is made to FIG. 9. FIG. 9 is a schematic diagram illustrating a transmission system 900 according to some embodiments of the present disclosure. In some embodiments, the transmission system 900 in FIG. 9 can be used to implement the transmission system 100 in FIG. 1.

A touch panel 911 and a touch panel 921 in FIG. 9 are similar to the touch panel 811 and the touch panel 821 in FIG. 8. Electrodes 9211 in the touch panel 921 correspond to a specific pattern, the specific pattern is similar to FIG. 8. As illustrated in FIG. 9, the specific pattern corresponds to a transmission region A9, the transmission region A9 is in a square-shape, and the electrodes 9211 in the transmission region A9 can emit the transmitting signals with a first frequency. One of major differences between FIG. 9 and FIG. 8 is that, in FIG. 9, electrodes 9111 on some locations are able (enabled) to receive sensing signals, and electrodes 9111 on other locations are unable (disabled) to receive the sensing signals. For example, electrodes 9111 at coordinates (1+2M, 1+2N) are able to receive the sensing signals, and other electrodes 9111 are unable to receive the sensing signals, in which M, N are equal to 0 or are positive integers. In other words, the electrodes 9111 at coordinates (1+2M, 1+2N) operate as receiving electrodes, and other electrodes 9111 operate as dummy electrodes (in a dummy state). In some embodiments, the touch device including the touch panel 911 can perform a handshake process with the touch device including the touch panel 921 in advance to determine which device operates as a transmitter, which device operates as a receiver, the shape of the transmission region A9, the first frequency, and which electrodes 9111 are enabled.

As illustrated in FIG. 9, when the touch panel 921 contacts or is significantly close to the touch panel 911 and there is a motion between the touch panel 921 and the touch panel 911, the electrodes 9111 at coordinates are able to receive the sensing signals. A processor coupled to the touch panel 911 can collect the sensing signals and acquire an absolute motion trajectory of the touch panel 921 according to the collected signals. Then, the processor can perform an application according to this absolute motion trajectory. In this embodiment, more power can be saved.

Figure 10:
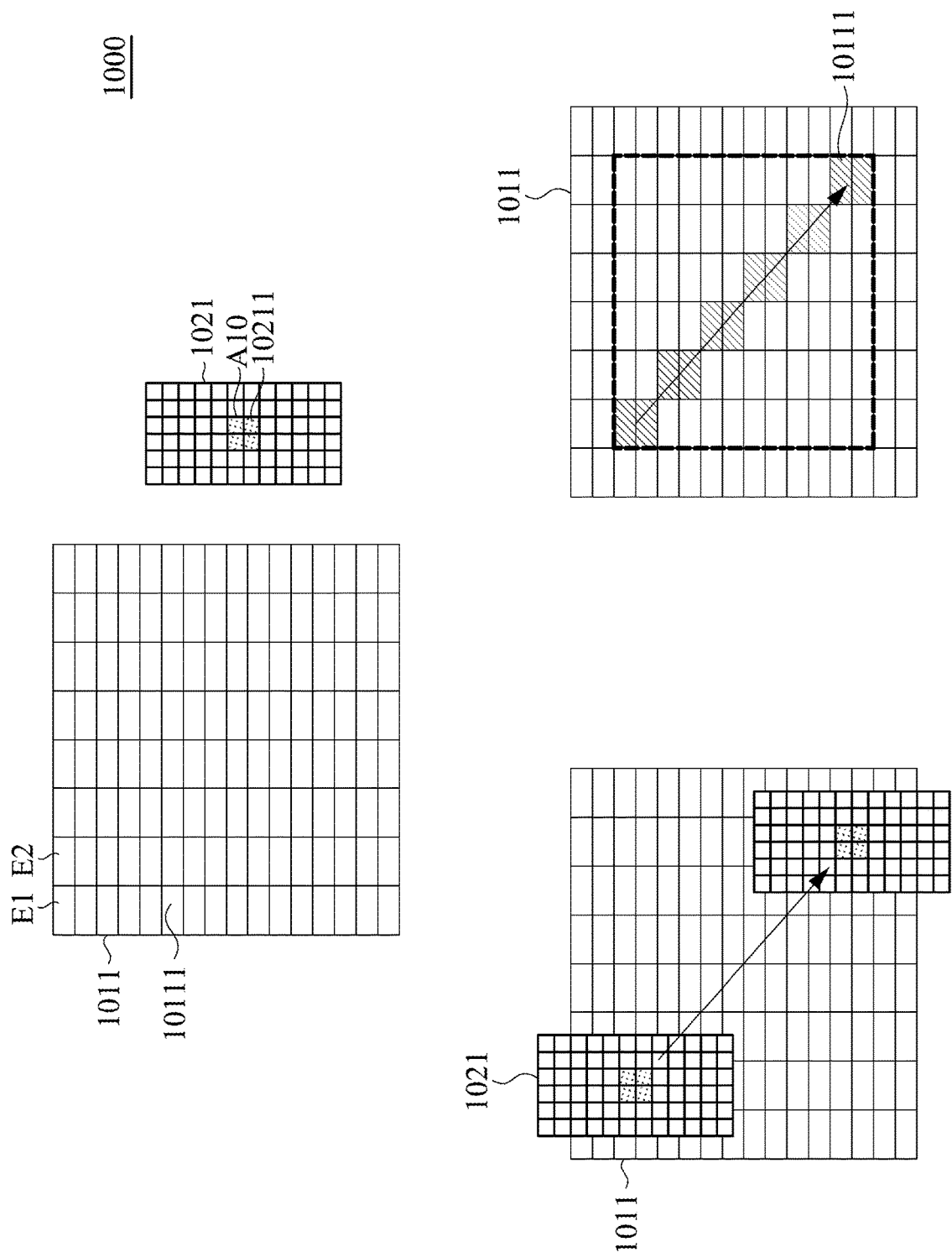
FIG. 10 is a schematic diagram illustrating a transmission system according to some embodiments of the present disclosure.

Reference is made to FIG. 10. FIG. 10 is a schematic diagram illustrating a transmission system 1000 according to some embodiments of the present disclosure. In some embodiments, the transmission system 1000 in FIG. 10 can be used to implement the transmission system 100 in FIG. 1.

A touch panel 1011 and a touch panel 1021 in FIG. 10 are similar to the touch panel 211 and the touch panel 221 in FIG. 2. Electrodes 10211 in the touch panel 1021 correspond to a specific pattern, the specific pattern is similar to FIG. 2. As illustrated in FIG. 10, the specific pattern corresponds to a transmission region A10, the transmission region A10 is in a square-shape, and the electrodes 10211 in the transmission region A10 can emit the transmitting signals with a first frequency. One of major differences between FIG. 10 and FIG. 2 is that, in FIG. 10, every two electrodes 10111 in a first direction (e.g., horizontal direction) are connected. For example, one electrode 10111 on the first column is connected to its adjacent electrode 10111 on the second column to be a first electrode set E1, one electrode 10111 on the third column is connected to its adjacent electrode 10111 on the fourth column to be a second electrode set E2, and so on. In some embodiments, the touch device including the touch panel 1011 can perform a handshake process with the touch device including the touch panel 1021 in advance to determine which device operates as a transmitter, which device operates as a receiver, the shape of the transmission region A10, the first frequency, and the configuration of the electrode sets E1-E2.

As illustrated in FIG. 10, when the touch panel 1021 contacts or is significantly close to the touch panel 1011 and there is a motion between the touch panel 1021 and the touch panel 1011, these electrode sets in the touch panel 1011 are able to receive the sensing signals. A processor coupled to the touch panel 1011 can collect the sensing signals and acquire an absolute motion trajectory of the touch panel 1021 according to the collected signals. Then, the processor can perform an application according to this absolute motion trajectory. In this embodiment, power and processing time can be saved.

Figure 11:
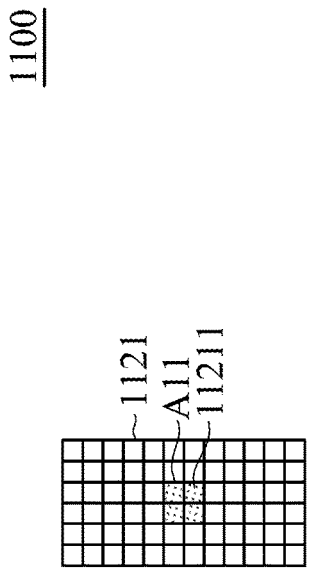
FIG. 11 is a schematic diagram illustrating a transmission system according to some embodiments of the present disclosure.
Figure 11:
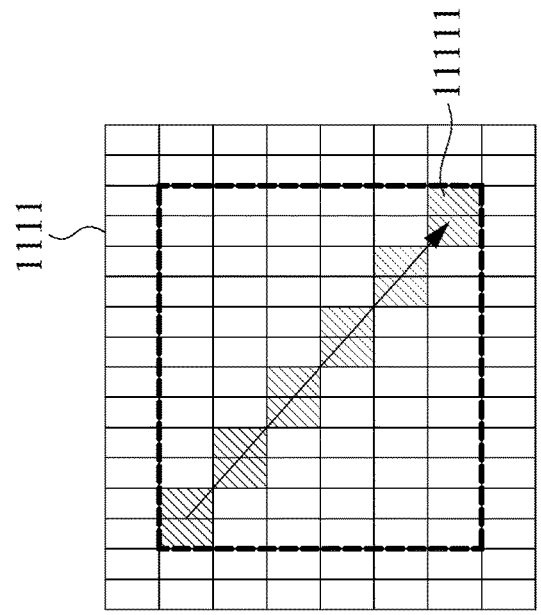
Figure 11:
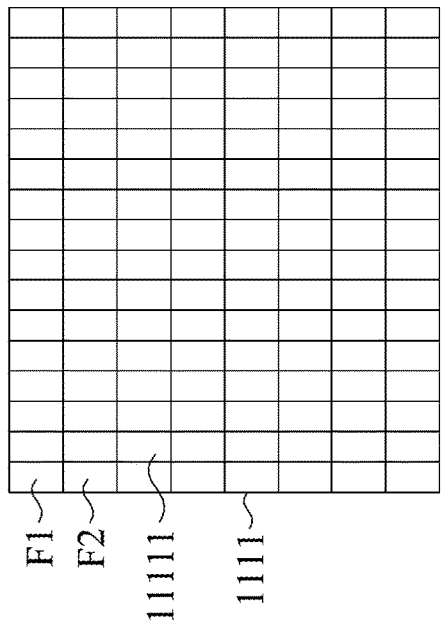
Figure 11:
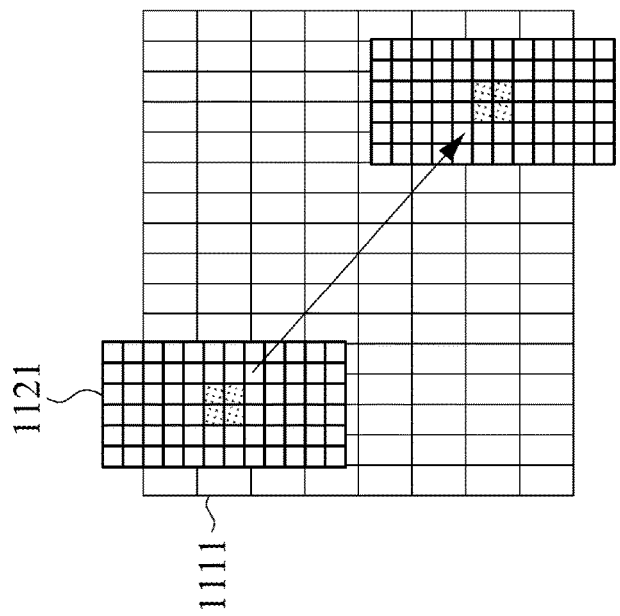

Reference is made to FIG. 11. FIG. 11 is a schematic diagram illustrating a transmission system 1100 according to some embodiments of the present disclosure. In some embodiments, the transmission system 1100 in FIG. 11 can be used to implement the transmission system 100 in FIG. 1.

A touch panel 1111 and a touch panel 1121 in FIG. 11 are similar to the touch panel 211 and the touch panel 221 in FIG. 2. Electrodes 11211 in the touch panel 1121 correspond to a specific pattern, the specific pattern is similar to FIG. 2. As illustrated in FIG. 11, the specific pattern corresponds to a transmission region A11, the transmission region A11 is in a square-shape, and the electrodes 11211 in the transmission region A11 can emit the transmitting signals with a first frequency. One of major differences between FIG. 11 and FIG. 2 is that, in FIG. 11, every two electrodes 11111 in a second direction (e.g., vertical direction) are connected. For example, one electrode 11111 on the first row is connected to its adjacent electrode 11111 on the second row to be a first electrode set F1, one electrode 11111 on the third row is connected to its adjacent electrode 11111 on the fourth row to be a second electrode set F2, and so on. In some embodiments, the touch device including the touch panel 1111 can perform a handshake process with the touch device including the touch panel 1121 in advance to determine which device operates as a transmitter, which device operates as a receiver, the shape of the transmission region A11, the first frequency, and the configuration of the electrode sets F1-F2.

As illustrated in FIG. 11, when the touch panel 1121 contacts or is significantly close to the touch panel 1111 and there is a motion between the touch panel 1121 and the touch panel 1111, these electrode sets in the touch panel 1111 are able to receive the sensing signals. A processor coupled to the touch panel 1111 can collect the sensing signals and acquire an absolute motion trajectory of the touch panel 1121 according to the collected signals. Then, the processor can perform an application according to this absolute motion trajectory. In this embodiment, power and processing time can be saved.

Figure 12:
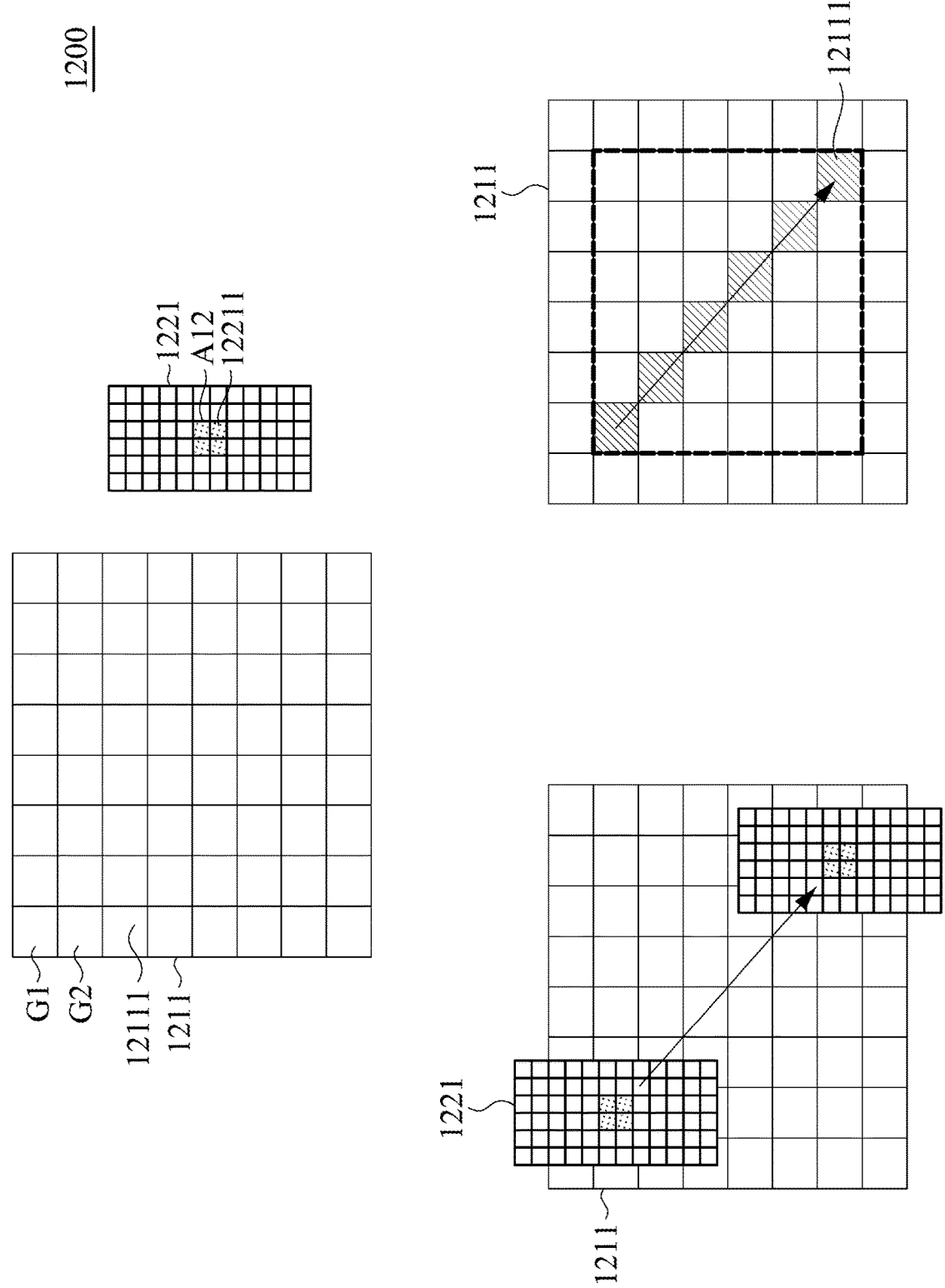
FIG. 12 is a schematic diagram illustrating a transmission system according to some embodiments of the present disclosure.

Reference is made to FIG. 12. FIG. 12 is a schematic diagram illustrating a transmission system 1200 according to some embodiments of the present disclosure. In some embodiments, the transmission system 1200 in FIG. 12 can be used to implement the transmission system 100 in FIG. 1.

A touch panel 1211 and a touch panel 1221 in FIG. 12 are similar to the touch panel 211 and the touch panel 221 in FIG. 2. Electrodes 12211 on the touch panel 1221 correspond to a specific pattern, the specific pattern is similar to FIG. 2. As illustrated in FIG. 12, the specific pattern corresponds to a transmission region A12, the transmission region A12 is in a square-shape, and the electrodes 12211 in the transmission region A12 can emit the transmitting signals with a first frequency. One of major differences between FIG. 12 and FIG. 2 is that, in FIG. 12, every four electrodes 12111 are connected. For example, one electrode 12111 on the first column and on the first row is connected to its adjacent electrode 12111 on the second column and the first row, its adjacent electrode 12111 on the first column and the second row, and its adjacent electrode 12111 on the second column and the second row to be a first electrode set G1. One electrode 12111 on the first column and on the third row is connected to its adjacent electrode 12111 on the second column and the third row, its adjacent electrode 12111 on the first column and the fourth row, and its adjacent electrode 12111 on the second column and the fourth row to be a second electrode set G2, and so on. In some embodiments, the touch device including the touch panel 1211 can perform a handshake process with the touch device including the touch panel 1221 in advance to determine which device operates as a transmitter, which device operates as a receiver, the shape of the transmission region A12, the first frequency, and the configuration of the electrode sets G1-G2.

As illustrated in FIG. 12, when the touch panel 1221 contacts or is significantly close to the touch panel 1211 and there is a motion between the touch panel 1221 and the touch panel 1211, these electrode sets in the touch panel 1211 are able to receive the sensing signals. A processor coupled to the touch panel 1211 can collect the sensing signals and acquire an absolute motion trajectory of the touch panel 1221 according to the collected signals. Then, the processor can perform an application according to this absolute motion trajectory. In this embodiment, power and processing time can be saved.

Figure 13:
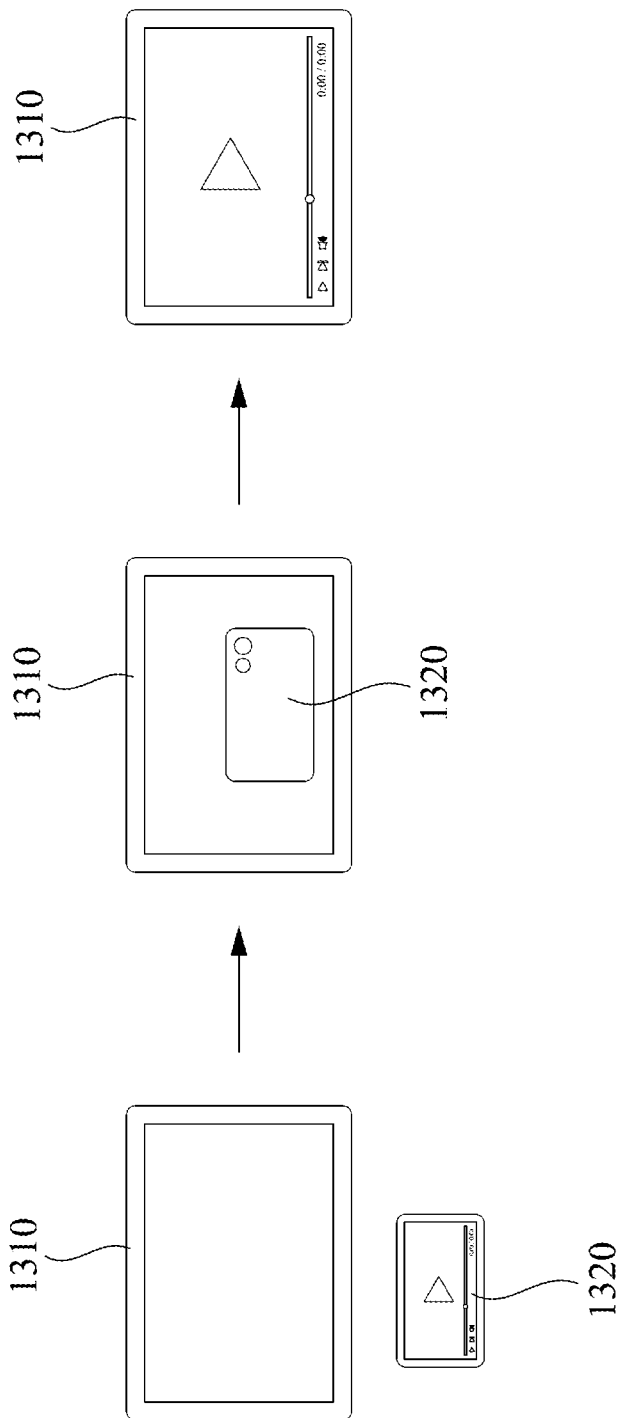
FIG. 13 is a schematic diagram illustrating an application of a transmission system according to some embodiments of the present disclosure.

Reference is made to FIG. 13. FIG. 13 is a schematic diagram illustrating an application of a transmission system 1300 according to some embodiments of the present disclosure. The transmission system 1300 can be implemented by one of the aforementioned transmission system 200, 300, 400, 500, 600, 700, 800, 900, 1000, 1100, or 1200.

As illustrated in FIG. 13, the transmission system 1300 includes a touch device 1310 and a touch device 1320. In this example, the touch device 1310 is a tablet and the touch device 1320 is a cell phone, but the present disclosure is not limited thereto.

As described above, the touch devices 1310 and 1320 can work together to operate in the application mode. For example, when a panel of the touch device 1320 contacts or is significantly close to a panel of the touch device 1310 and there is a motion or rotation (motion trajectory or rotation angle) between the touch device 1320 and the touch device 1310, the touch device 1310 can perform an application according to this absolute motion trajectory or this absolute rotation angle. In FIG. 13, the application is that the image (e.g., video) on a screen of the touch device 1320 can be projected on a screen of the touch device 1310. Thus, the image (e.g., video) can be viewed on the larger screen of the touch device 1310.

Figure 14:
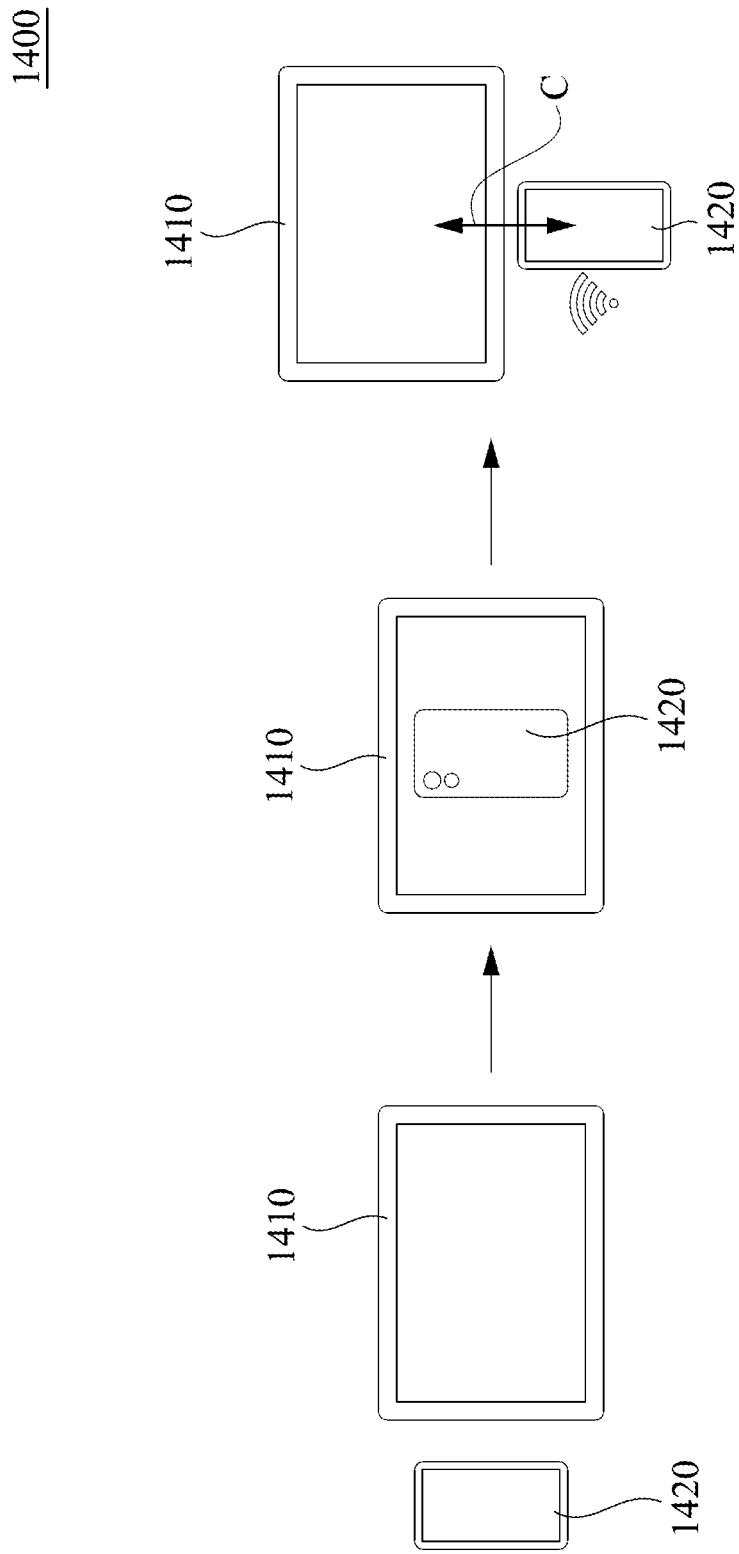
FIG. 14 is a schematic diagram illustrating an application of a transmission system according to some embodiments of the present disclosure.

Reference is made to FIG. 14. FIG. 14 is a schematic diagram illustrating an application of a transmission system 1400 according to some embodiments of the present disclosure. The transmission system 1400 can be implemented by one of the aforementioned transmission system 200, 300, 400, 500, 600, 700, 800, 900, 1000, 1100, or 1200.

As illustrated in FIG. 14, the transmission system 1400 includes a touch device 1410 and a touch device 1420. In this example, the touch device 1410 is a tablet and the touch device 1420 is a cell phone, but the present disclosure is not limited thereto.

As described above, the touch devices 1410 and 1420 can work together to operate in the application mode. For example, when a panel of the touch device 1420 contacts or is significantly close to a panel of the touch device 1410 and there is a motion or rotation (motion trajectory or rotation angle) between the touch device 1420 and the touch device 1410, a network connection (e.g., WIFI technology) between the touch device 1420 and the touch device 1410 can be established quickly according to this absolute motion trajectory or this absolute rotation angle. In some related approaches, one device needs to open its hotspot, and another device needs to search the hotspot and type in the password to establish the network connection between them. These operations consume a lot of time. Compared to the aforementioned related approaches, the network connection (e.g., WIFI technology) between the touch device 1420 and the touch device 1410 can be established quickly by just moving or rotating the touch device 1420 relative to the touch device 1410. After the network connection C (e.g., WIFI technology) is established, the touch device 1410 can use the network source (e.g., 4G) of the touch device 1420 via the network connection (e.g., WIFI technology).

Figure 15:
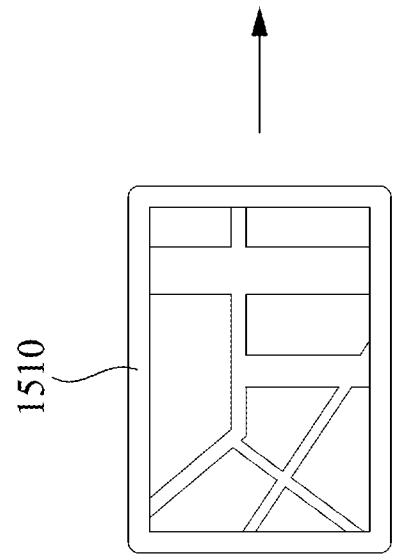
FIG. 15 is a schematic diagram illustrating an application of a transmission system according to some embodiments of the present disclosure.
Figure 15:
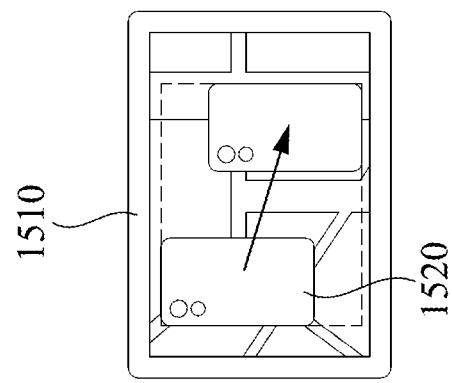
Figure 15:
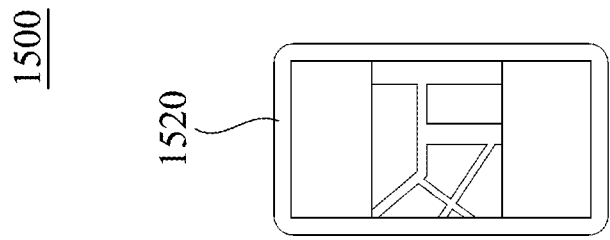

Reference is made to FIG. 15. FIG. 15 is a schematic diagram illustrating an application of a transmission system 1500 according to some embodiments of the present disclosure. The transmission system 1500 can be implemented by one of the aforementioned transmission system 200, 300, 400, 500, 600, 700, 800, 900, 1000, 1100, or 1200.

As illustrated in FIG. 15, the transmission system 1500 includes a touch device 1510 and a touch device 1520. In this example, the touch device 1510 is a tablet and the touch device 1520 is a cell phone, but the present disclosure is not limited thereto.

As described above, the touch devices 1510 and 1520 can work together to operate in the application mode. For example, when a panel of the touch device 1520 contacts or is significantly close to a panel of the touch device 1510 and there is a motion or rotation (motion trajectory or rotation angle) between the touch device 1520 and the touch device 1510, the touch device 1510 can perform an application according to this absolute motion trajectory or this absolute rotation angle. In FIG. 15, the application is that the touch device 1520 (e.g., a smaller touch device) can be used to acquire a screenshot of the touch device 1510 (e.g., a larger touch device) and a range of the screenshot corresponds to a range of this motion trajectory or this rotation angle.

Figure 16:
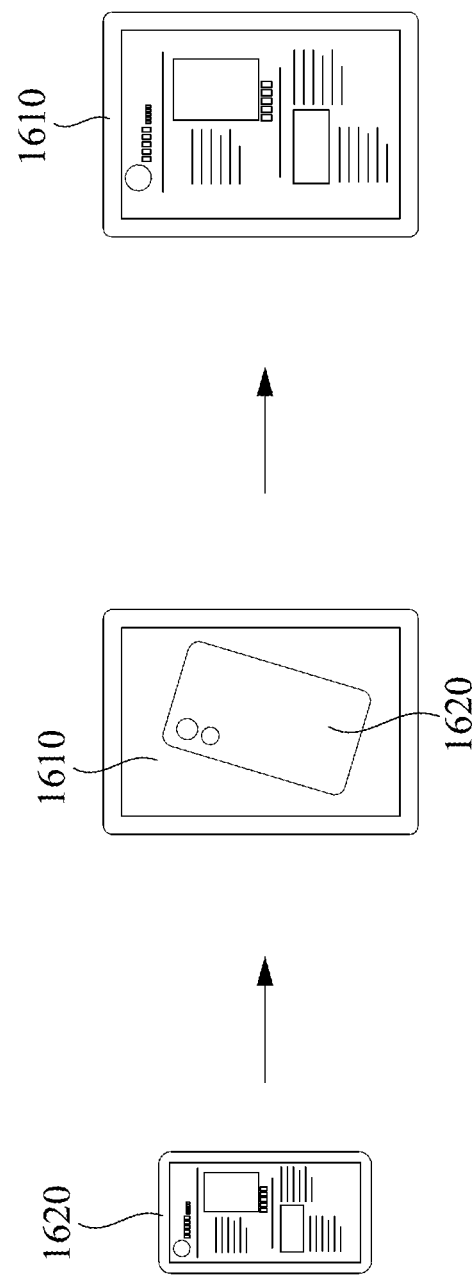
FIG. 16 is a schematic diagram illustrating an application of a transmission system according to some embodiments of the present disclosure.

Reference is made to FIG. 16. FIG. 16 is a schematic diagram illustrating an application of a transmission system 1600 according to some embodiments of the present disclosure. The transmission system 1600 can be implemented by one of the aforementioned transmission system 200, 300, 400, 500, 600, 700, 800, 900, 1000, 1100, or 1200.

As illustrated in FIG. 16, the transmission system 1600 includes a touch device 1610 and a touch device 1620. In this example, the touch device 1610 is a tablet and the touch device 1620 is a cell phone, but the present disclosure is not limited thereto.

As described above, the touch devices 1610 and 1620 can work together to operate in the application mode. For example, when a panel of the touch device 1620 contacts or is significantly close to a panel of the touch device 1610 and there is a motion or rotation (motion trajectory or rotation angle) between the touch device 1620 and the touch device 1610, the touch device 1610 can perform an application according to this absolute motion trajectory or this absolute rotation angle. In FIG. 16, the application is that the touch device 1610 (e.g., a larger touch device) can display a website which is displayed on the touch device 1620 (e.g., a smaller touch device). Thus, the website can be viewed on the larger screen of the touch device 1610.

Figure 17:
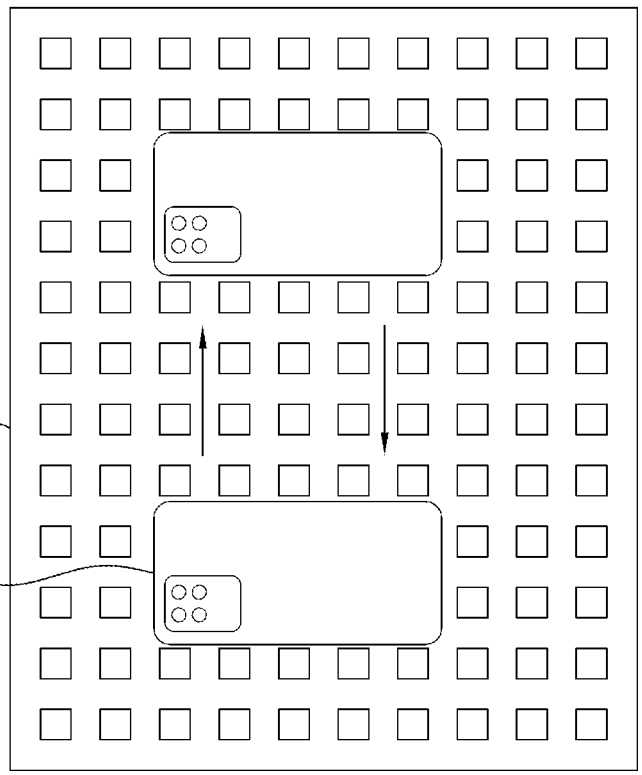
FIG. 17 is a schematic diagram illustrating an application of a transmission system according to some embodiments of the present disclosure.
Figure 17:
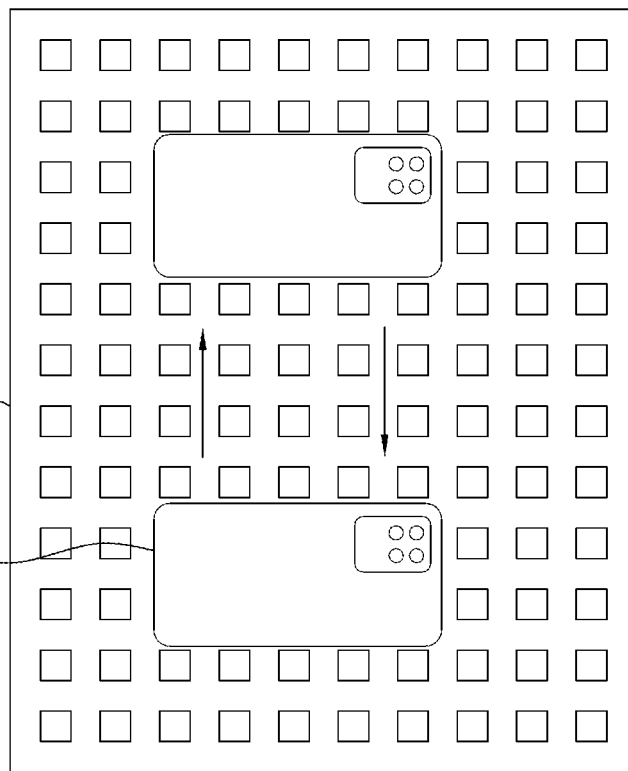

Reference is made to FIG. 17. FIG. 17 is a schematic diagram illustrating an application of a transmission system 1700 according to some embodiments of the present disclosure. The transmission system 1700 can be implemented by one of the aforementioned transmission system 200, 300, 400, 500, 600, 700, 800, 900, 1000, 1100, or 1200.

As illustrated in FIG. 17, the transmission system 1700 includes a touch device 1710 and a touch device 1720. In this example, the touch device 1710 is a tablet and the touch device 1720 is a cell phone, but the present disclosure is not limited thereto.

As described above, the touch devices 1710 and 1720 can work together to operate in the application mode. For example, when the a panel of touch device 1720 contacts or is significantly close to a panel of the touch device 1710 and there is a motion or rotation (motion trajectory or rotation angle) between the touch device 1720 and the touch device 1710, the touch device 1710 can perform an application according to this absolute motion trajectory or this absolute rotation angle. In FIG. 17, the application is that the touch device 1710 can perform an authentication unlocking processing according to the specific motion trajectory or the specific rotation angle of the touch device 1720. For example, the touch device 1710 can be logged in or unlocked when the touch device 1720 moves along a path of the example on the left-hand side in FIG. 17, but the touch device 1710 cannot be logged in or unlocked when the touch device 1720 moves along a path of the example on the right-hand side in FIG. 17. In this method, the transmitted data is less, and the touch device 1710 can analyze different motion trajectories or different rotation angles as different IDs or different passwords. In addition, since this kind of IDs or passwords (different motion trajectories or different rotation angles) is not typed on a screen, the security is higher. In some embodiments, this method can be combined with other information (e.g., fingerprint) to implement double unlocking mechanism.

Figure 18:
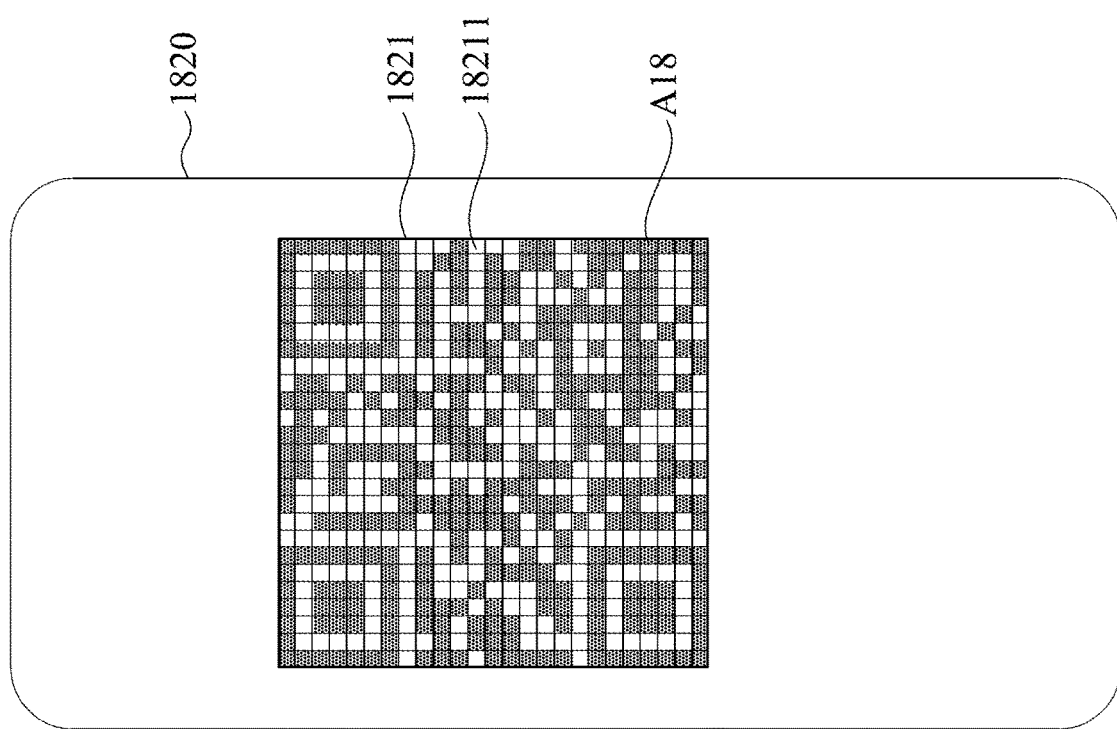
FIG. 18 is a schematic diagram illustrating a touch device according to some embodiments of the present disclosure.

Reference is made to FIG. 18. FIG. 18 is a schematic diagram illustrating a touch device 1820 according to some embodiments of the present disclosure. In some embodiments, the touch device 1820 (e.g., a cell phone) is used to implement the touch device 1720 in FIG. 17 to unlock the touch device 1710 (e.g., a smart TV) in FIG. 17, and even enable the touch device 1710 to log in a specific services (e.g., log information of invisible barcode carries URL).

As illustrated in FIG. 18, the touch device 1820 includes a touch panel 1821, and the touch panel includes electrodes 18211. As illustrated in FIG. 18, electrodes 18211 correspond to a specific pattern, and this specific pattern is an invisible barcode. To be more specific, the electrodes 18211 illustrated with a dark color form multiple transmission regions A18, and these transmission regions A18 form the invisible barcode. In the aforementioned application mode, the electrodes 18211 illustrated with the dark color can operate as transmitting electrodes to emit transmitting signals, and the electrodes 18211 illustrated with a white color do not emit transmitting signals.

Since a user cannot see the shape of the invisible barcode. Thus, compared to other visible code (e.g., one-dimensional barcode, QR code), the security of invisible barcode is higher.

How to generate the invisible barcode are described in following paragraphs.

In some embodiments, an application program in the touch device 1820 can generate the invisible barcode according to a touch chip in the touch device 1820. This invisible barcode can be identified by the same touch chip or other compatible touch chips.

In some other embodiments, an application program in the touch device 1820 can generate the invisible barcode according to received authentication information sent from a server and an authentication code in the touch device.

In some other embodiments, an application program in the touch device 1820 can generate the invisible barcode according to a touch chip in the touch device 1820 and an operation of a user (the operation can be determined by the user, not limited to an unlocking operation).

The unlocking operation is taken as an example for better understanding.

The touch device 1820 (master device) can utilize the invisible barcode to unlock another touch device (slave device). In this application, the master device is a barcode transmitter, and the slave device is a barcode receiver. In other words, the electrodes on the touch panel in the slave device can receive corresponding sensing signals, and the processor in the slave device can determine whether to be unlocked according to the sensing signals.

In some embodiments, the touch device 1820 can be a cell phone, and the cell phone can utilize the invisible barcode to unlock a smart TV. In some other embodiments, the touch device 1820 can be a smart watch, and the smart watch can utilize the invisible barcode to unlock a cell phone or a door lock with a touch panel. However, the present disclosure is not limited thereto.

In some related approaches, if the user would like to utilize the invisible code on the master device to log in the slave device (or the user shares the login information of the master device to the slave device such that the slave device can log in a specific service automatically), the user needs to unlock the slave device first, and then log into the specific service. Compared to the related approaches, this invisible barcode on the master device can be utilized to unlock the slave device and log into the specific service simultaneously. To be more specific, the unlock information and the login information (e.g., a URL) can be transmitted in an invisible barcode from the master device to a processing chip (e.g., a touch chip or a display chip) in the slave device, and the processing chip in the slave device can be connected to the specific service directly according to the logging information (e.g., a URL).

A first method how the master device communicates to the slave device is described below. The slave device sends a request periodically to the master device. The master device can send an acknowledge signal (ACK) in response to the request. After the slave device receives the acknowledge signal, the slave device can communicate with the master device. For example, information about the invisible barcode can be transmitted between the master device and the slave device, and the information includes a format, encode information, a transmission frequency, a clock rate, or other information. After the slave device receives the information and the authentication between the master device and the slave device are checked, the information transmission is stopped and the slave device can decode the information and perform correspond operations.

A second method how the master device communicates to the slave device is described below. A first wireless system in the master device can transmit parameters to a second wireless system in the slave device. The first wireless system can be Bluetooth or NFC, and the second wireless system can be a touch panel for transmitting or receiving RF signals. After the slave device receives the parameters, the slave device can perform corresponding operations.

In other embodiments, the master device can be a wearable electronic device, such as a smart bracelet or a smart watch. The slave device can be an inter-connected electronic device, such as a computer, a display device, a multimedia interactive machine, a touch combination lock, etc.

A user can perform the fingerprint identification through the touch panel of a wearable device first. According to the user's need, a processor disposed in the wearable device can generate an invisible barcode based on the user's fingerprint characteristics, and upload the invisible barcode to a server. The slave device confirms to the server whether there is information corresponding to the slave device. When the slave device acquires the invisible barcode from the server, a controller disposed in the slave device interprets the function corresponding to the invisible barcode. When a touch panel disposed in the slave device detects that it matches an invisible barcode on the master device, the slave device performs the corresponding function.

To be more specific, the user wears a smart watch, and the user touches the fingerprint identification touch panel of the smart watch. A processor in the smart watch generates a corresponding invisible barcode and uploads the invisible barcode to a server. Then, the user brings the smart watch close to a touch panel in a touch combination lock disposed on a door. When the touch panel receives the invisible barcode, the touch combination lock is unlocked. In another embodiment, a user uses an application program which is installed in his smart watch and corresponds to his electric vehicle to generate an invisible barcode based on his fingerprint, and the invisible barcode can be used to start his electric vehicle. In a condition that the user brings the invisible barcode close to a touch panel of the electric vehicle, after a processor disposed in the electric vehicle checks it, the electric vehicle is started.

The aforementioned method can store the user's password information in the master device, so as to avoid that each slave device has the user's confidential information. This can reduce the possibility of the confidential information being leaked from the slave devices.

Figure 19:
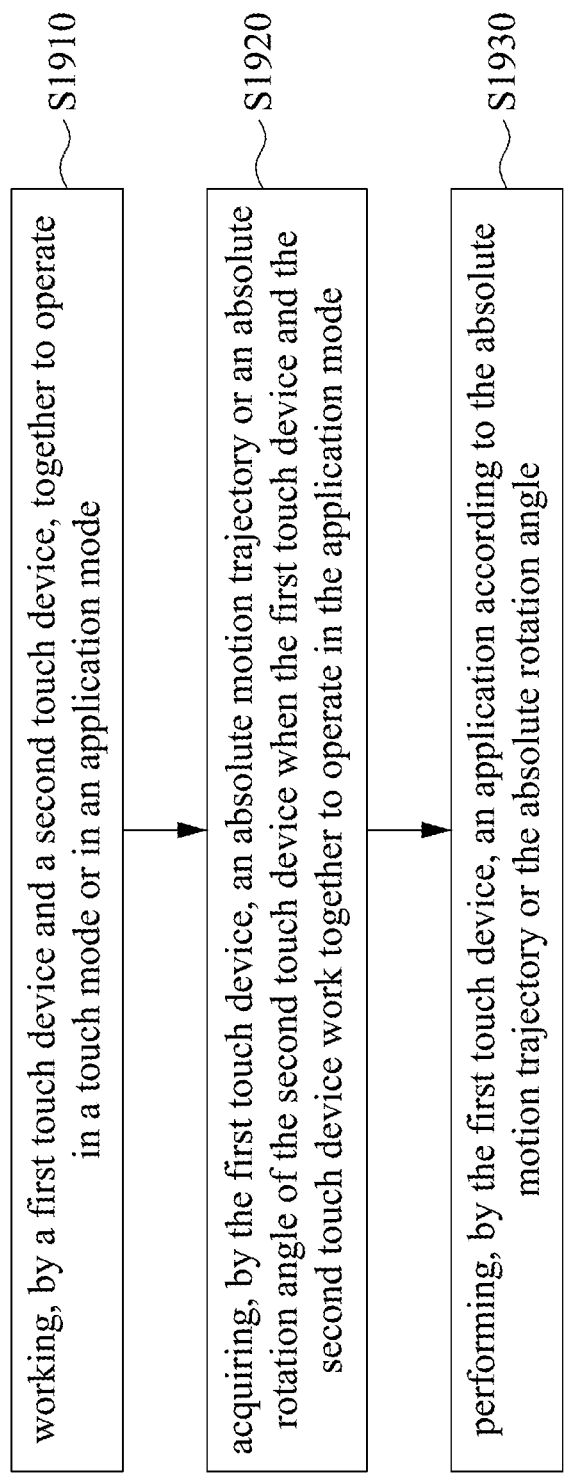
FIG. 19 is a flow diagram illustrating a transmission method according to some embodiments of the present disclosure.

Reference is made to FIG. 19. FIG. 19 is a flow diagram illustrating a transmission method 1900 according to some embodiments of the present disclosure. As illustrated in FIG. 19, the transmission method 1900 includes operation S1910, operation S1920, and operation S1930. For ease of understanding, the transmission method 1900 is described in following paragraphs with the transmission system 100 in FIG. 1, but the present disclosure is not limited to the transmission system 100 in FIG. 1.

In operation S1910, the touch device 110 and the touch device 120 work together in the touch mode or the application mode. For example, when the touch device 110 or the touch device 120 operates individual and operates in the normal touch mode, the touch device 110 or the touch device 120 can detect the touch event on its touch panel.

When the touch device 110 and the touch device 120 work together in the application mode, as operation S1920, the touch device 110 can acquire the absolute motion trajectory or an absolute rotation angle of the touch device 120.

In operation S1930, the touch device 110 can perform an application according to the absolute motion trajectory or the absolute rotation angle. For example, the application can be the application in FIG. 13, FIG. 14, FIG. 15, FIG. 16, FIG. 17, or FIG. 18.

Based on the descriptions above, in the present disclosure, various applications can be performed according to absolute motion trajectory or the absolute rotation angle of the two touch devices. Accordingly, it is easier and more convenient to complete various applications.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:
1. A transmission system, comprising:
   a first touch device, comprising:
      a first touch panel comprising a plurality of first electrodes; and
      a first processor coupled to the first touch panel; and
   a second touch device comprising a transmission region and the transmission region forms an invisible barcode, wherein the first touch device and the second touch device work together to operate in a touch mode or in an application mode, wherein when the first touch device and the second touch device work together to operate in the application mode, the transmission region uses the invisible barcode to transmit a transmission signal to the first touch device to unlock the first touch device, wherein the transmission signal comprises unlock information, wherein the plurality of first electrodes are to receive the unlock information, and the first processor is to determine whether to unlock the first touch device according to the unlock information.

2. The transmission system of claim 1, wherein when the first touch device operates in the touch mode, the plurality of first electrodes operate in a transmitting state and in a receiving state, wherein when the first touch device and the second touch device work together to operate in the application mode, the plurality of first electrodes operate in the receiving state.

3. The transmission system of claim 2, wherein the second touch device comprises:

a second touch panel comprising a plurality of second electrodes; and a second processor coupled to the second touch panel, wherein when the second touch device operates in the touch mode, the plurality of second electrodes operate in the transmitting state and in the receiving state, wherein when the first touch device and the second touch device work together to operate in the application mode, the plurality of second electrodes operate in the transmitting state.

4. The transmission system of claim 3, wherein the first touch panel and the second touch panel are self-capacitance type.

5. The transmission system of claim 2, wherein the transmission signal further comprises login information, wherein the plurality of first electrodes are to receive the login information, and the first processor is to determine whether to control the first touch device to be connected to a web service according to the login information.

6. The transmission system of claim 5, wherein the login information comprises a URL.

7. The transmission system of claim 1, wherein the first touch device is to send a request to the second touch device, wherein the second touch device is to send an acknowledge signal in response to the request, wherein when the first touch device receives the acknowledge signal, the transmission region uses the invisible barcode to transmit the transmission signal to the first touch device.

8. The transmission system of claim 1, wherein the second touch device is to generate the invisible barcode according to a fingerprint characteristic for unlocking the first touch device.

9. The transmission system of claim 8, wherein the second touch device is further to upload the invisible barcode to a server, wherein when the first touch device determines that the invisible barcode received from the second touch device matches the invisible barcode on the server, the first touch device is unlocked and the first touch device performs a function corresponding to the invisible barcode.

* * * * *

UNITED STATES PATENT AND TRADEMARK OFFICE
CERTIFICATE OF CORRECTION

| | | |
|---|---|---|
| PATENT NO. | : 12,105,908 B2 | |
| APPLICATION NO. | : 18/348363 | |
| DATED | : October 1, 2024 | |
| INVENTOR(S) | : Yi-Hsien Wang and Yun-Hsiang Yeh | |

It is certified that error appears in the above-identified patent and that said Letters Patent is hereby corrected as shown below:

On the Title Page

Item (30) the Foreign Application Priority Number should read as "111104072" rather than "11110407.2".

Signed and Sealed this
Twenty-sixth Day of November, 2024

Katherine Kelly Vidal
*Director of the United States Patent and Trademark Office*